United States Patent
Noll et al.

(10) Patent No.: US 9,674,591 B2
(45) Date of Patent: Jun. 6, 2017

(54) METHODS AND APPARATUS FOR ASYMMETRIC DISTRIBUTION OF MIXED CONTENT VIA A NETWORK

(71) Applicant: Time Warner Cable Enterprises LLC, New York, NY (US)

(72) Inventors: Kevin A. Noll, Leesburg, VA (US); David J. Musser, State College, PA (US); Paul D. Brooks, Weddington, NC (US); Peter H. Wolff, Bradenton, FL (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/733,694

(22) Filed: Jun. 8, 2015

(65) Prior Publication Data

US 2016/0360302 A1    Dec. 8, 2016

(51) Int. Cl.
*H04J 14/00* (2006.01)
*H04Q 11/00* (2006.01)
*H04L 12/24* (2006.01)

(52) U.S. Cl.
CPC ..... *H04Q 11/0067* (2013.01); *H04L 41/5096* (2013.01); *H04Q 2011/0015* (2013.01); *H04Q 2011/0081* (2013.01)

(58) Field of Classification Search
CPC .............. H04Q 11/0067; H04J 14/0227; H04J 14/0232; H04J 14/0246
USPC .......................................................... 398/45
See application file for complete search history.

(56) References Cited

U.S. PATENT DOCUMENTS

| | | |
|---|---|---|
| 5,189,671 A | 2/1993 | Cheng |
| 5,341,365 A | 8/1994 | Clarke |
| 5,453,988 A | 9/1995 | Clarke |
| 5,548,432 A | 8/1996 | Clarke et al. |
| 5,574,584 A | 11/1996 | Darcie et al. |
| 5,694,234 A | 12/1997 | Darcie et al. |
| 5,809,187 A | 9/1998 | Peck, Jr. et al. |

(Continued)

OTHER PUBLICATIONS

A. J. Phillips, et al., "Redundancy Strategies for a High Splitting Optically Amplified Passive Optical Network", J. Lightwave Technol., vol. 19, No. 2, pp. 137-149, Feb. 2001.

(Continued)

*Primary Examiner* — Don N Vo
(74) *Attorney, Agent, or Firm* — Gazdzinski & Associates, PC

(57) ABSTRACT

Methods and apparatus for asymmetric distribution of mixed content via a network. Current optical fiber-based access network technologies are multiplexed onto the same fiber for delivery via a common Optical Distribution Network (ODN). Various embodiments of the present disclosure are directed to combining (using optical multiplexing and power splitting) two or more optical user-technologies onto a single Passive Optical Network (PON) while maintaining an independent serving group size and operational independence for each of the combined user-technologies. The disclosed methods and apparatus allow the so-called "outside plant" architecture (i.e., the fiber optic infrastructure from the headend to the customer premises) to be independent of the user-technologies and network architecture that are provided via the outside plant.

20 Claims, 10 Drawing Sheets

(56) References Cited

U.S. PATENT DOCUMENTS

| | | |
|---|---|---|
| 5,864,413 A | 1/1999 | Feldman et al. |
| 5,930,018 A | 7/1999 | Effenberger |
| 6,108,713 A | 8/2000 | Sambamurthy et al. |
| 6,144,471 A | 11/2000 | Eyberg et al. |
| 6,327,400 B1 | 12/2001 | Harstead et al. |
| 6,493,335 B1 | 12/2002 | Darcie et al. |
| 6,563,613 B1 | 5/2003 | Tochio |
| 6,577,414 B1 | 6/2003 | Feldman et al. |
| 6,597,479 B1 | 7/2003 | Chu et al. |
| 6,654,563 B1 | 11/2003 | Darcie et al. |
| 6,665,498 B1 | 12/2003 | Jiang et al. |
| 6,681,083 B1 | 1/2004 | Koonen |
| 6,684,031 B1 | 1/2004 | Kogelnik et al. |
| 6,771,908 B2 | 8/2004 | Eijk et al. |
| 7,088,921 B1 | 8/2006 | Wood |
| 7,181,142 B1 | 2/2007 | Xu et al. |
| 7,218,854 B1 | 5/2007 | Unitt et al. |
| 7,283,554 B2 | 10/2007 | Ophir et al. |
| 7,602,820 B2 | 10/2009 | Helms et al. |
| 8,713,623 B2 | 4/2014 | Brooks |
| 2002/0030865 A1 | 3/2002 | Kawate et al. |
| 2002/0041728 A1 | 4/2002 | Yamashita et al. |
| 2002/0063924 A1 | 5/2002 | Kimbrough et al. |
| 2003/0063847 A1 | 4/2003 | Buabbud |
| 2003/0177215 A1 | 9/2003 | Sutherland et al. |
| 2004/0240466 A1 | 12/2004 | Unitt et al. |
| 2007/0274717 A1 | 11/2007 | Xu et al. |
| 2007/0297716 A1 | 12/2007 | Helkey et al. |
| 2008/0273877 A1 | 11/2008 | Palacharla et al. |
| 2009/0232500 A1* | 9/2009 | Villarruel .......... H04B 10/2575 398/65 |
| 2010/0098407 A1 | 4/2010 | Goswami et al. |
| 2012/0321315 A1 | 12/2012 | Timm et al. |
| 2013/0177314 A1 | 7/2013 | Mizuguchi et al. |
| 2014/0223504 A1* | 8/2014 | Ling .................. H04N 21/6168 725/116 |
| 2014/0229604 A1* | 8/2014 | Pfeffer .................. H04L 47/822 709/224 |
| 2015/0050016 A1 | 2/2015 | Takita et al. |
| 2015/0110489 A1 | 4/2015 | Brooks |

OTHER PUBLICATIONS

B.N. Desai, et al., An Optical Implementation of a Packet-Based (Ethernet) MAC in a WDM Passive Optical Network Overlay, in OFC '01 Tech Dig., paper WN5, Anaheim, CA, Mar. 2001.

C. J. Chae, et al., "A New ATM PON System Suitable for Local Access and Local Private Networking Services", in OFC '01 Tech. Deg., paper WU4, Anaheim, CA, Mar. 2001.

C.J. Chae, et al., "A PON System Suitable for Internetworking Optical Network Units Using a Fiber Bragg Grating on the Feeder Fiber", IEEE Photon. Technol. Lett., vol. 11, No. 12, pp. 1686-1688, Dec. 1999.

"Computer Networks" by A. Tanenbaum, Prentice-Hall, 1981, pp. 292-295.

Glen Kramer, et al., "Ethernet Passive Optical Network (EPON): Building a Next-Generation Optical Access Network", IEEE Commun. Mag., vol. 40, No. 2, pp. 66-73, Feb. 2002.

Itu-T, "Broadband Optical Access Systems Based on Passive Optical Networks (PON)", ITU-T Recommendation G.983.1, Oct. 1998.

"Telecommunication Networks" by M. Schwartz, Addison-Wesley, 1987, pp. 441-447.

* cited by examiner

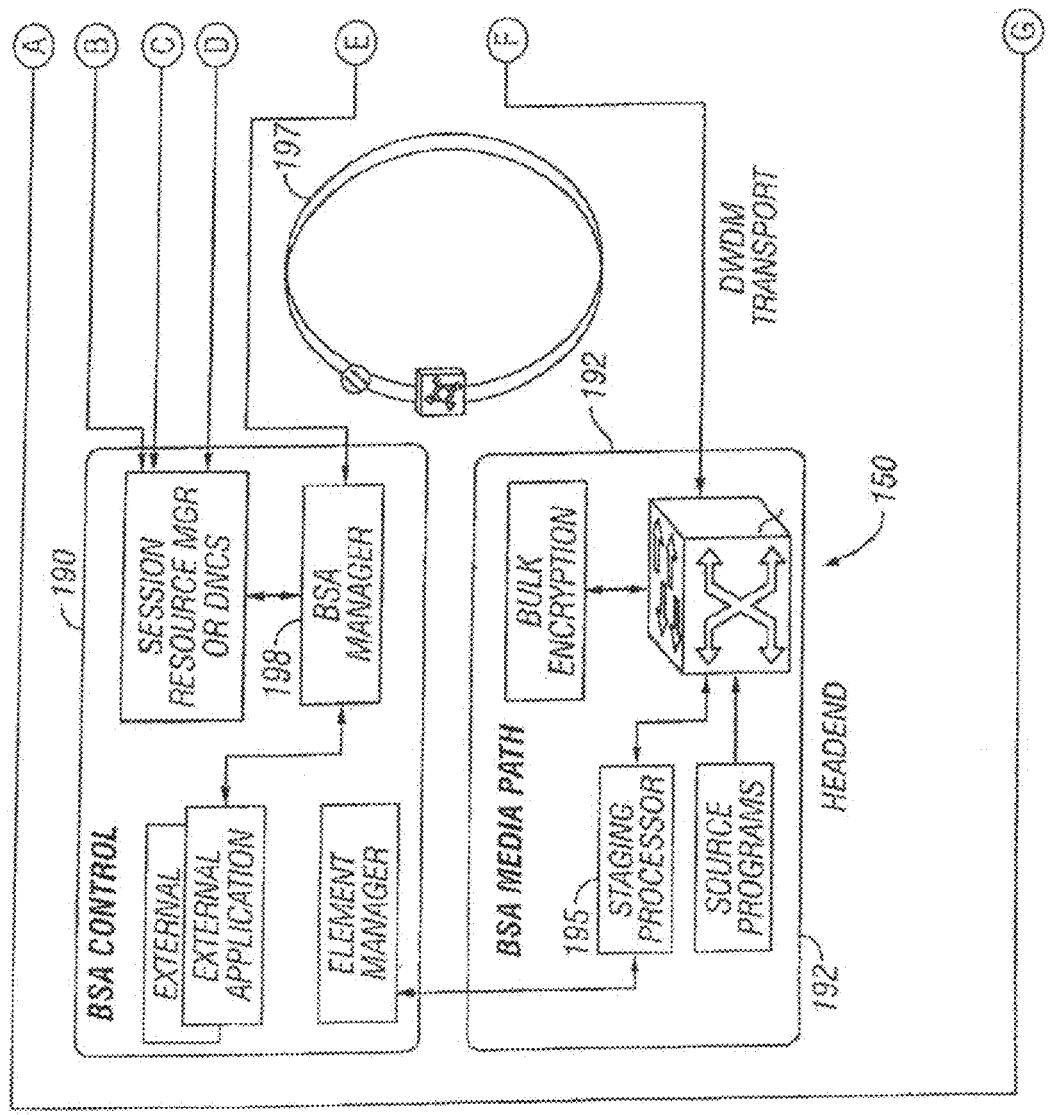

METHODS AND APPARATUS FOR ASYMMETRIC DISTRIBUTION OF MIXED CONTENT VIA A NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content and/or data delivery over a network. More particularly, the present disclosure is related, in one exemplary aspect, to methods and apparatus for asymmetric distribution of mixed content via a network, such as a passive optical network (PON). In one exemplary embodiment, a PON is configured to deliver different services (e.g., Ethernet over PON (EPON) and Radio Frequency over Glass (RFoG)) to differently sized service groups, via a common fiber optic plant.

2. Description of Related Technology

The provision of content to a plurality of subscribers in a content distribution network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Service providers, and more specifically, multiple system operators (MSOs), continually strive to increase the data capacity of their networks to increase revenue. Many MSOs have migrated to optical technologies by replacing the coax portion of existing Hybrid Fiber Coax (HFC) networks with a single-fiber Passive Optical Network (PON). Exemplary networks utilize different optical wavelengths in the downstream (e.g., to the consumer premises) and upstream directions (e.g., from the consumer premises). Typically, optical networks use 1550 nm, 1490 nm, and 1577 nm in the downstream direction, and 1310 nm, 1270 nm, and 1610 nm in the upstream direction. The upstream return path allows the fiber infrastructure to support both RFoG (Radio Frequency over Glass) and PONs simultaneously.

In conventional Optical Distribution Networks (ODNs), so-called Optical Network Units (ONUs) (also referred to RFoG ONUs (R-ONUs), Optical Network Terminals (ONTs) and/or "micronodes" in RFoG networks) are typically deployed at each of multiple customer premises locations. In a conventional optical network, a single strand of optical fiber is typically shared among multiple downstream ONUs (typically 32, but other numbers are possible). In the downstream direction, a light splitting resource divides downstream light power to the ONUs such that a portion of the downstream light power is transmitted to each ONU. Each of the ONUs receives light containing identical information in the downstream direction (from the service provider to a corresponding subscriber customer). Typically, a signal analyzer analyzes the received signal to determine which data is directed to the corresponding subscriber. In certain instances, a portion of content encoded on a respective downstream optical signal can include data available for consumption by multiple subscribers.

For upstream transmissions (customer to service provider), each of the ONUs can include a respective laser transmitter that is manufactured to identical specifications. As such, the transmitters transmit on the same or nearly identical wavelength of light in the upstream direction to the service provider. Even though two transmitters on the same wavelength cannot transmit at the same time; two transmitters on different wavelengths can transmit at the same time. Each wavelength is separately received by a corresponding receiver. An optical detection device in the upstream optical receiver converts the optical signal into a respective electrical output that is proportional to the instantaneous sum of the combined optical powers contributed by the two lasers.

Installation of fiber optics is very expensive, thus ODN infrastructures multiplex multiple optical services over the same underlying optical "plant" (i.e., physical infrastructure). Specifically, existing schemes for multiplexing and combining optical signals assume the same service group size for all the signals being transmitted on the ODN/PON. Unfortunately, while each user-technology is treated uniformly in terms of physical distribution, each user-technology has specific requirements and cost structures. Consequently, some services are over-subscribed, while other services are under-subscribed. For example, consumers that receive RFoG services also receive Ethernet over PON (EPON) services, even though RFoG is more profitable and can support more users than EPON.

Coupling different user-technologies together also significantly complicates repair, maintenance, and upgrades to capital equipment. In particular, changes in the configuration of one user-technology will result in a disruption of service to the other coupled user-technologies. For example, a change in the EPON service group size might force a disruption to the customers using Coarse Wavelength Division Multiplexing (CWDM) Ethernet, the latter of which are usually higher-value customers).

Ideally, service providers seek to optimize different user-technology services (e.g., EPON, RFoG, etc.) so as to maximize customer expectations, within the operating constraints of the ODN. In particular, rather than splitting all user-technology services out to all users indiscriminately, each user or service group (e.g., a neighborhood, etc.) should receive only the services to which they have subscribed and/or can be delivered in a cost efficient manner. More generally, solutions are needed for asymmetric distribution of mixed content via a network, such as a passive optical network.

SUMMARY

The present disclosure addresses the foregoing needs by disclosing, inter alia, methods and apparatus for asymmetric distribution of mixed content via a network.

In one aspect of the present disclosure, a method for asymmetric distribution of mixed content via a passive optical network is disclosed. In one embodiment, the method comprises: receiving a plurality of different content; dividing a plurality of different subscribers into a plurality of service groups; combining said outputs of various ones of said plurality of different service group sizing splitters; and delivering said combined outputs via an outside plant (OSP) to said plurality of different subscribers.

In one variant, said plurality of different content comprises one or more of 1 Gbps Ethernet Passive Optical Network (EPON), 10 Gbps EPON, Radio Frequency over Glass (RFoG), 1 Gbps Ethernet, and/or 10 Gbps Ethernet signals.

In a second variant, said combining of said outputs of various ones of said plurality of different service group sizing splitters comprises a first combination of contents and a second combination of contents; and said delivering said combined outputs comprises delivering said first combination to a first service group of said plurality of service groups and delivering said second combination to a second service group of said plurality of service groups. In one such variant, said first combination comprises residential user content and the second combination comprises commercial user content.

In another variant, said combining comprises a passive combination of two or more content.

In a fourth variant, said combining comprises an active combination of two or more content.

In a fifth variant, said combining is based on one or more network considerations. In one such case, said combining is dynamically performed. Alternatively, said combining may be performed manually by a service technician.

In another variant, said dividing said plurality of different subscribers into a plurality of service groups comprises one or more asymmetric groups.

In a second aspect of the present disclosure, an apparatus configured to distribute mixed content asymmetrically via a network is described. In one embodiment, the apparatus includes: a plurality of upstream interfaces configured to receive content from one or more active components; a plurality of downstream interfaces configured to transmit one or more combined content via an outside plant (OSP); an array of serving group sizing splitters configured to split said received content from one or more active components into a number of outputs; and an array of passive optical network combining multiplexers (PCMs), wherein each PCM is configured to combine various ones of said number of outputs into corresponding ones of said one or more combined content.

In one such variant, at least two of said corresponding ones of said one or more combined content comprise different content.

In a second such variant, said number of outputs corresponds to one or more service groups targeted by said received content.

In another such implementation, said array of PCMs are configured to combine said number of outputs for distribution to said one or more service groups.

In a fourth variant, said one or more service groups targeted by said received content is determined based on one or more network considerations.

In another aspect of the present disclosure, a non-transitory computer readable apparatus is disclosed. In one exemplary embodiment, the non-transitory computer readable apparatus comprises one or more instructions which when executed causes a processor to: dynamically divide a plurality of subscribers into a plurality of service groups; dynamically determine one or more content targeted for at least one of said plurality of service groups; configure at least one service group sizing splitter to provide said one or more content to a passive optical network combining multiplexer (PCM); and wherein said PCM is configured to combine said one or more content and transmit said combined one or more content to said at least one of said plurality of service groups.

In one variant, said dynamic division of said plurality of subscribers is based on a network consideration.

In a second variant, said at least one of said plurality of service groups comprises a fixed set of subscribers. In one case, said fixed set of subscribers comprise residential users. In another such case, said fixed set of subscribers is determined based on a physical structure of an outside plant (OSP).

These and other aspects become apparent when considered in light of the disclosure provided herein.

Figure 1:
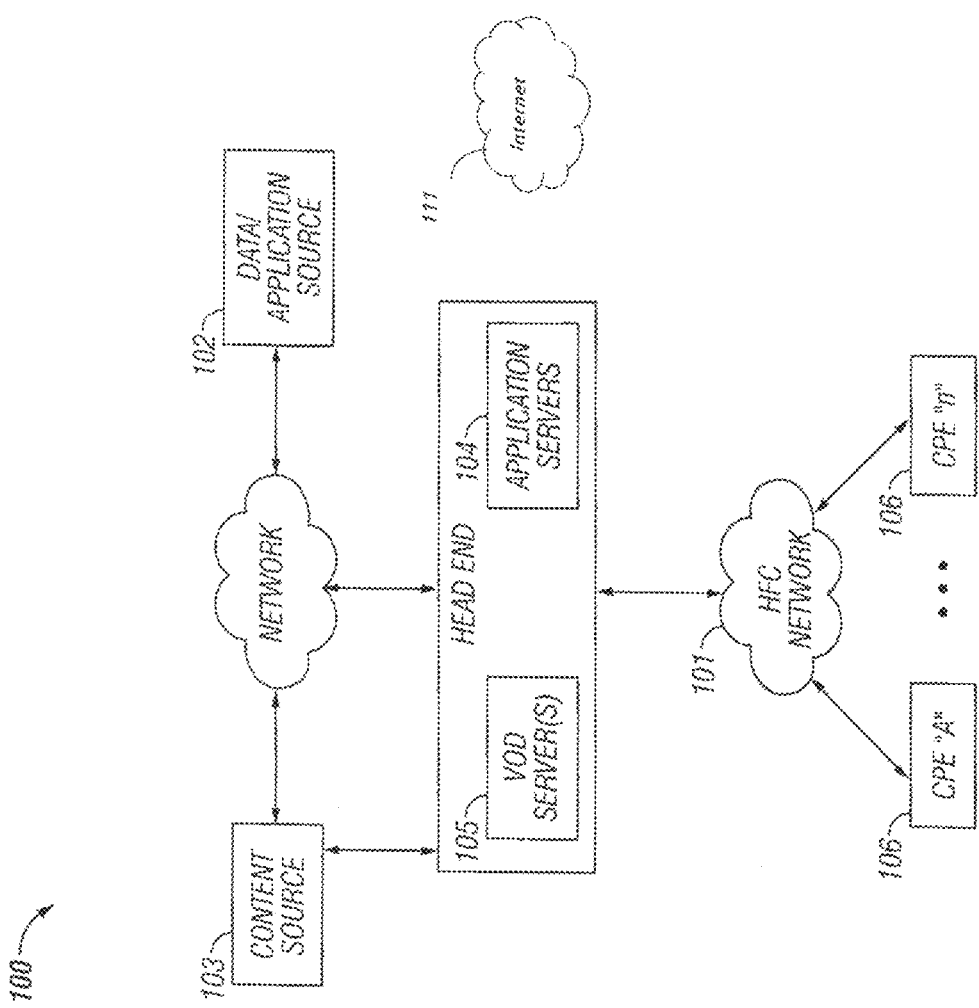
FIG. 1 is a functional block diagram illustrating an exemplary HFC cable network configuration useful with the present disclosure.

All Figures © Copyright 2015 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, tablets, "phablets", PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IPTV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, OLEDs, incandescent and fluorescent devices. Display devices may also include less dynamic devices such as, for example, printers, e-ink devices, and the like.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer without limitation to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), or IrDA families.

As used herein, the term "Optical Distribution Network (ODN)" refers to, without limitation, any fiber-optic network that multiplexes upstream and/or downstream optical signals onto an optical fiber and distributes those signals to one or more users. In one exemplary embodiment, an ODN augments and/or substitutes for Hybrid Fiber-Coax (HFC) networks used for transmission of radio frequency (RF) signals. Other common uses of ODNs include without limitation: Synchronous Optical Networking (SONET), Optical Transport Network (OTN), Ethernet, etc.

As used herein, the term "outside plant" (OSP) refers to, without limitation, any physical plant which exists between a logical demarcation point at the service provider and a logical demarcation point located at the customer premises. The OSP generally includes a trunk fiber(s), drop fiber(s), optical splitter(s) and similar components, and the supporting infrastructure such as conduit(s), pole(s), cabinet(s), etc. In one exemplary embodiment, the logical service provider demarcation point is a PON combining block and the logical customer premises demarcation point is an enclosure installed and maintained by the network provider (such as the Assignee hereof).

As used herein, the term "Passive Optical Network (PON)" refers to a specific ODN/OSP design for fiber-optic distribution that follows a point-to-multipoint (tree-like) topology. While PONs are based on a tree-based network topology, those of ordinary skill in the related arts, given the contents of the present disclosure, will readily appreciate that the various principles described herein may be readily adapted to other network topologies. Common examples of network topologies include without limitation: ring, mesh, tree, star, bus, etc.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, NFC (e.g., ISO 14443A/B), narrowband/FDMA, OFDM, PCS/DCS, LTE/LTE-A/TD-LTE, analog cellular, Zigbee, CDPD, satellite systems, millimeter wave or microwave systems, acoustic, and infrared (i.e., IrDA).

Overview

Current user-technologies (such as Ethernet over Passive Optical Networks (EPON), Gigabit Ethernet PON (GPON), Radio Frequency over Glass (RFoG), Coarse Wave Division Multiplexing (CWDM) Ethernet and Dense Wave Division Multiplexing (DWDM) Ethernet, etc.) are fiber-based access network technologies that are multiplexed onto the same fiber for delivery via a common Optical Distribution Network (ODN). Various embodiments of the present disclosure are directed to combining (using optical multiplexing and power splitting) two or more optical user-technologies onto a single Passive Optical Network (PON) while maintaining an independent serving group size and operational independence for each of the combined user-technologies. The disclosed methods and apparatus allow the so-called "outside plant" architecture (i.e., the fiber optic infrastructure from the headend to the customer premises) to be independent of the user-technologies and network architecture that are provided via the outside plant.

Selective provision of user-technologies to each service group allows each technology to operate independent of the others and independent of the outside plant infrastructure. More generally, as described in greater detail hereinafter, decoupling user-technologies from service groups enables finer control of user-technology deployment to service groups and ultimately customers. Targeted service deployments reduce over-subscription and under-subscription issues, thus improving overall revenue while simultaneously reducing unnecessary network overhead. Additionally, decoupling user-technologies from service groups reduces the number of outages due to repairs, maintenance, or upgrades to technology that would otherwise affect commonly distributed technologies. Finally, those of ordinary skill in the related arts will readily appreciate, given the contents of the present disclosure, that the disclosed schemes preserve or enhance the fiber utilization (more users per fiber) of the ODN.

In one exemplary embodiment, EPON and GPON are used for commercial and residential delivery of Internet access and delivery of Ethernet-based layer-2 services (typically commercial); RFoG is a technology used to transmit existing RF signals (analog/digital television signals, DOCSIS signals) over a PON; CWDM and DWDM are methods for transmitting Ethernet (and non-Ethernet signals) in a (typically) point-to-point fashion (typically used for physically secure network connectivity installations). While the following disclosure is presented within the context of EPON, GPON, RFoG, CWDM-based Ethernet, and DWDM-based Ethernet delivery, those of ordinary skill in the related arts, given the contents of the present disclosure, will readily appreciate that the various principles described herein may be used in the operation of any optical transport technology that traverses an ODN arranged as a PON for connectivity between a hub (central office) and the customer premises.

DETAILED DESCRIPTION OF EXEMPLARY EMBODIMENTS

Exemplary embodiments of the apparatus and methods of the present disclosure are now described in detail. While these exemplary embodiments are described in the context of a passive optical network (PON) cable system architecture, the general principles and advantages of the disclosure may be extended to any network that multiplexes frequency (or wavelength) signaling onto a common medium. Common examples of such network technologies and architectures, include without limitation: broadband, narrowband, wired or wireless, terrestrial or satellite, managed or unmanaged (or combinations thereof), or otherwise, the following therefore being merely exemplary in nature.

It will also be appreciated that while described generally in the context of institutional service provision (e.g. academic, commercial, government, non-profit, etc.), the present disclosure may be readily adapted to other types of environments (e.g., home networks, etc.) as well. Myriad other applications are possible.

Further, although described in the context of service provision over an externally managed network, the architectures and techniques described herein may be readily applied to internal network management. The external managed network embodiments presented are merely used to demonstrate the flexibility and general applicability of the principles described herein (e.g. may be implemented with or without full administrator control of a network), and should not be considered in any way limiting.

While these exemplary embodiments are described in the context of a passive optical multiplexing, combining, splitting etc., the general principles and advantages of the disclosure may be extended to other types of optical and/or electrical signal manipulation, passive or otherwise, the following therefore being merely exemplary in nature. For example, in some cases, the signal manipulations may be performed with active components. In other embodiments, the signal manipulations may be performed in analog and/or digital domains. Still other implementations may incorporate other signal manipulations, such as filtering, signal reconstruction, re-clocking, etc.

Bearer Network

FIG. 1 illustrates a typical content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC, PON) network 101. A simple architecture including one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1a (described in greater detail below), or others, may be used.

The data/application origination point 102 includes any medium that allows data and/or applications (such as a VOD-based or "Watch TV" application) to be transferred to a distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 includes a computer system where such applications may enter the network system. Distribution servers are well known in the networking arts, and accordingly not described further herein.

The VOD server 105 includes a computer system where on-demand content may be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that may be accessed by a distribution server 104.

Figure 1A:
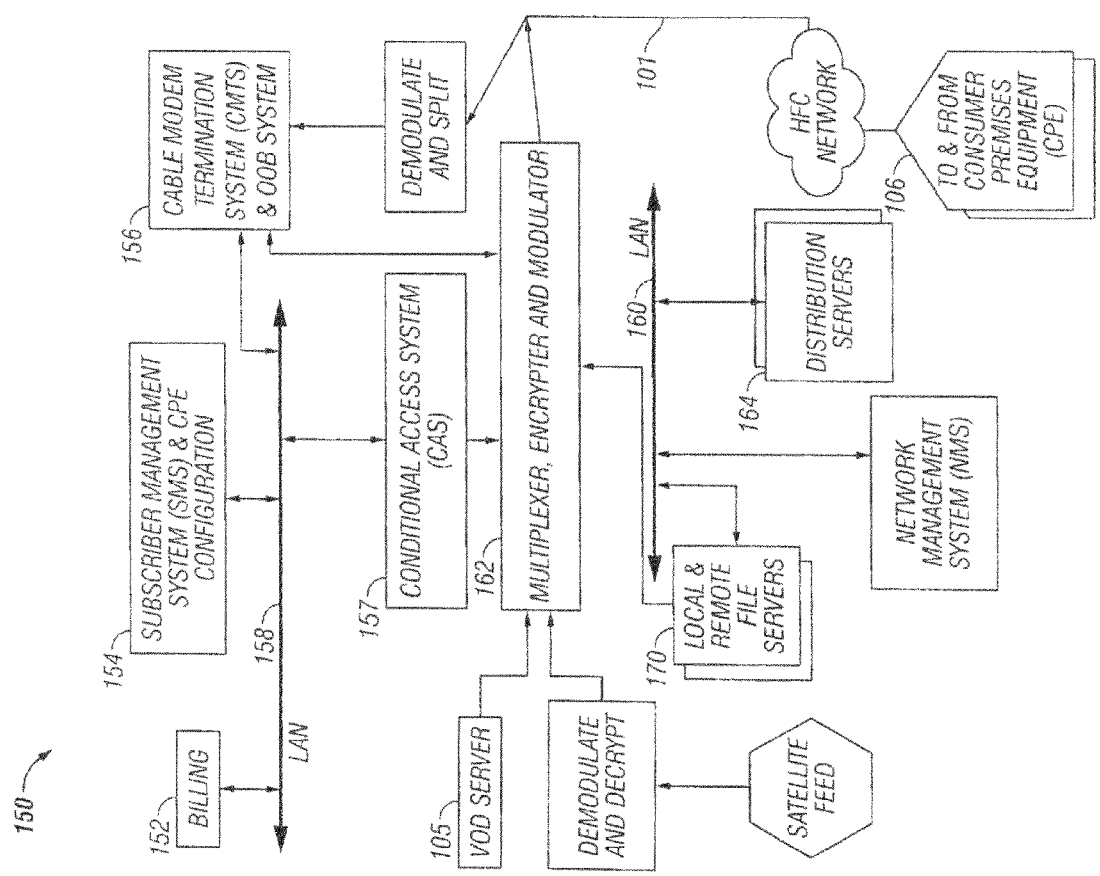
FIG. 1a is a functional block diagram illustrating one exemplary local service node configuration useful with the present disclosure.

Referring now to FIG. 1a, one exemplary embodiment of a headend architecture is described. As shown in FIG. 1a, the headend architecture 150 includes typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each service provider may have multiple headends deployed using custom architectures.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs via a variety of interposed network components.

Figure 1B:
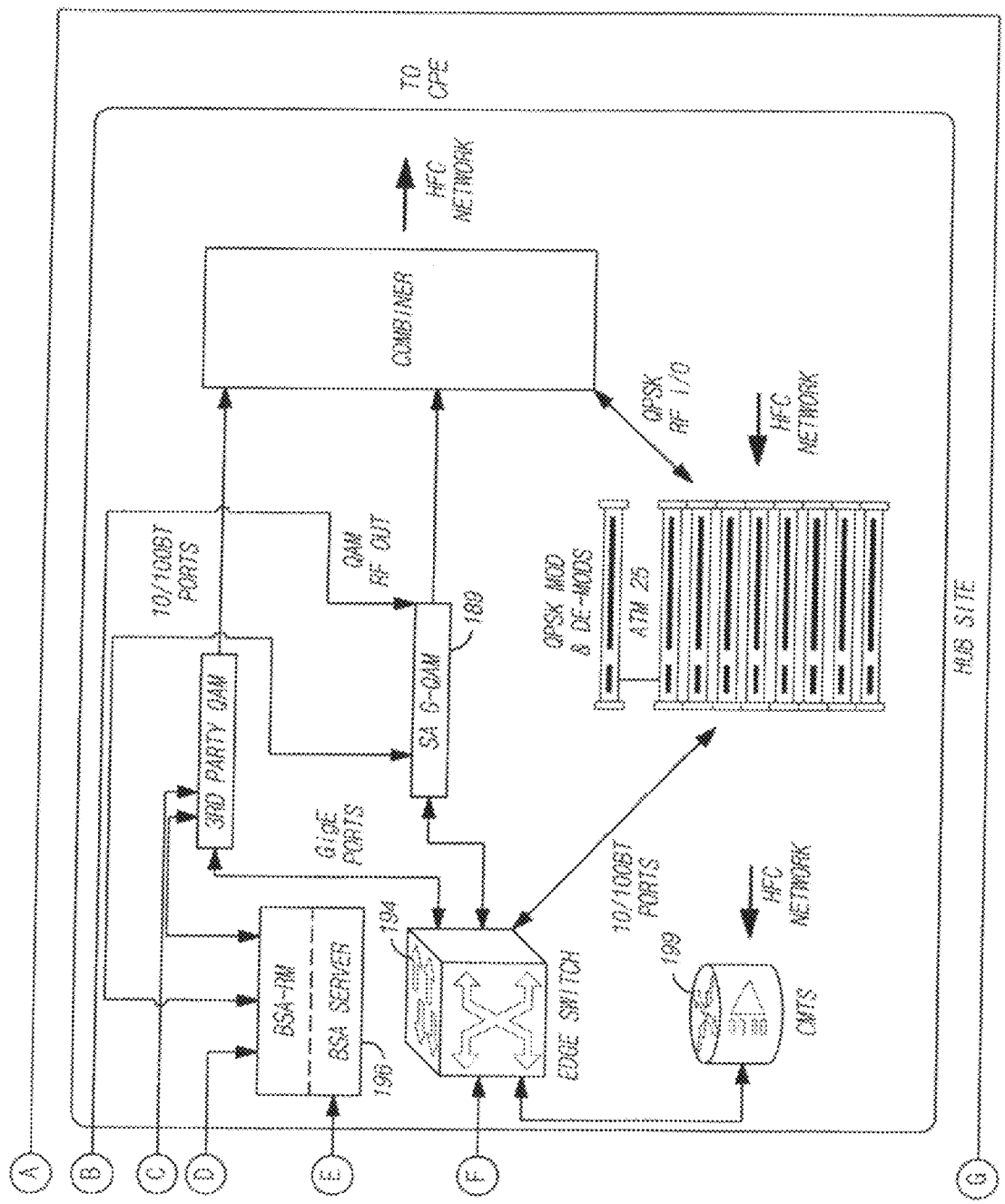
FIG. 1b is a functional block diagram illustrating one exemplary packetized content delivery network architecture useful with the present disclosure.

It will also be recognized, however, that the multiplexing operation(s) need not necessarily occur at the headend 150 (e.g., in the aforementioned MEM 162). For example, in one variant, at least a portion of the multiplexing is conducted at a broadcast switched architecture (BSA) switching node or hub (see discussion of FIG. 1b provided subsequently herein). As yet another alternative, a multi-location or multi-stage approach may be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks

FIG. 1b illustrates an exemplary "switched" network architecture. While a so-called "broadcast switched architecture" or BSA network is illustrated in this exemplary network architecture embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1b shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. Patent Application Publication No. 2003/0056217 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a and 1b also deliver Internet data services using the Internet protocol (IP), although other protocols and transport mechanisms of the type well known in the digital communication art may be substituted. One exemplary delivery paradigm includes delivering MPEG-based video content, with the video transported to user PCs (or IP-based STBs) over the aforementioned DOCSIS channels including MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF and/or optical channels. In this fashion, a parallel delivery mode to the normal broadcast delivery exists; i.e., delivery of video content both over traditional downstream channels to the tuner of the user's STB or other receiver device for viewing on the television, and also as packetized IP data to the user's PC or other IP-enabled device via the user's cable modem. Delivery in such packetized modes may be unicast, multicast, or broadcast.

Referring again to FIG. 1b, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the appropriate modulator 189, which transmits the packets on one or more physical electrical and/or optical channels to the CPE. The CPE 106 are each configured to monitor the particular assigned electrical or optical channels (such as via a port or socket ID/address, or other such mechanism) for IP packets intended for the subscriber premises/address that they serve.

"Passive Optical" Network (PON) Specific Considerations

As previously alluded to, it is advantageous and/or necessary to transport multiple signal types on a single optical fiber. Typically, this is accomplished by optically multiplexing the signals according to wavelength/frequency and/or time. In wavelength/frequency multiplexing schemes, each signal is assigned one or more distinct wavelength(s)/frequency(ies). In time multiplexing schemes, each signal is assigned one or more distinct time resources (e.g., a slice of time dedicated to the signal). In one exemplary embodiment of the present disclosure, a passive optical network (PON) supports RFoG, 1 G EPON, 10 G EPON, and select Ethernet signals on a single optical fiber.

In one such implementation, the optical wavelength bands of interest are the O-band (1260-1360 nm), E-band (1360-1460 nm), S-band (1460-1530 nm), C-band (1530-1565 nm), and L-band (1565-1625 nm). For example, the O-band may be assigned for use by 1 Gbps EPON and 10 Gbps EPON upstream transmissions. The upper E-band and S-band may be assigned to CWDM/RFoG for 1 Gbps and 10 Gbps Ethernet transmission interleaved with the 1 Gbps EPON downstream transmission. The C-band and L-band may be used for additional 1 Gbps and 10 Gbps Ethernet channels interleaved or alternated with RFoG upstream and downstream and/or a subset of DWDM channels. The U-band may be assigned for use by in-service (non-disruptive) test measurements. The exemplary wavelength assignments are summarized in APPENDIX A.

Different optical technologies have different connectivity requirements. For example, a key parameter that must be considered is the optical loss budget. Exemplary optical performance values for the systems addressed in this architecture are listed in APPENDIX B.

Methods

Figure 2:
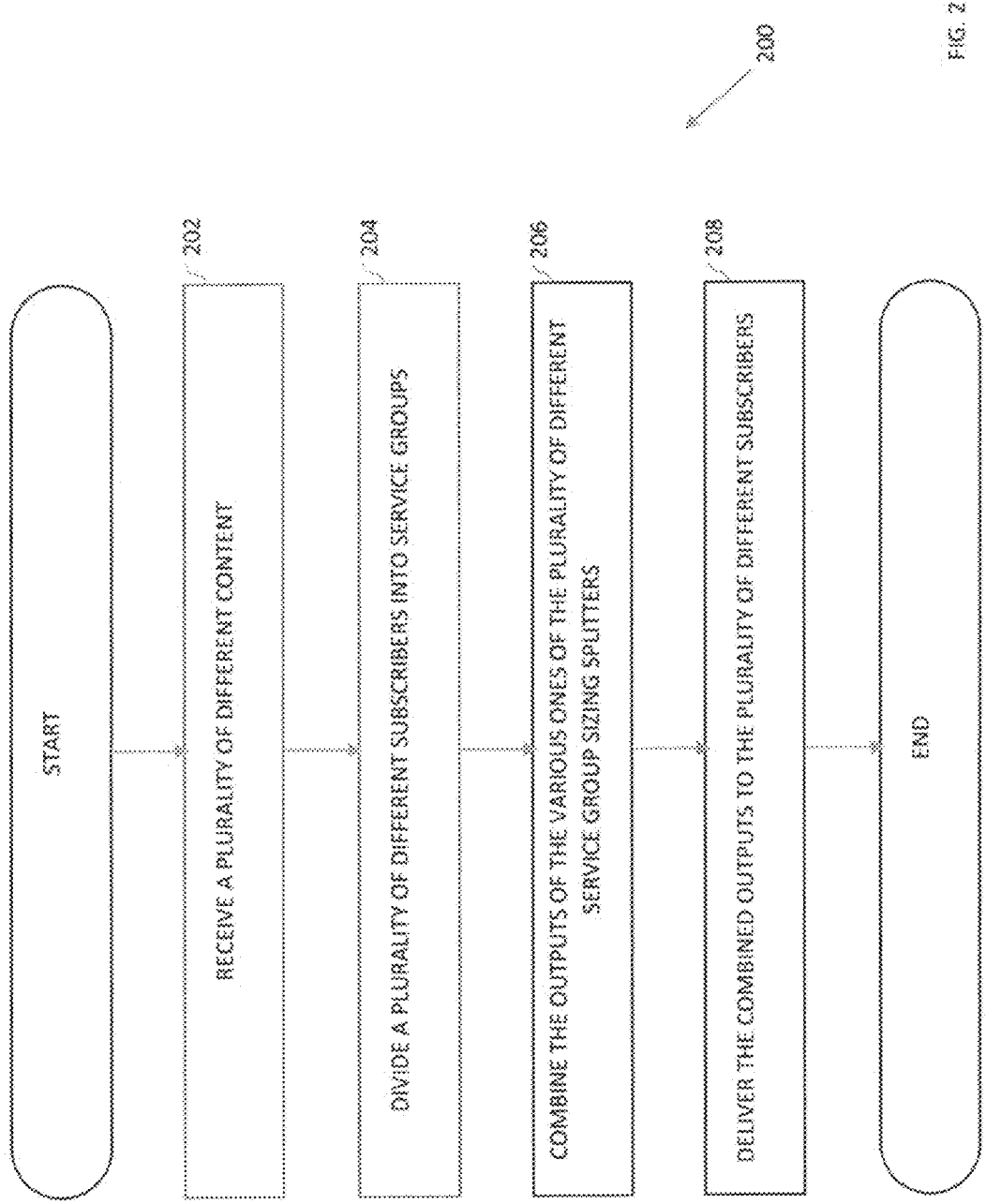
FIG. 2 is a logical flow diagram of one generalized method for asymmetric distribution of mixed content via a network.

FIG. 2 is a logical flow diagram of a generalized method for asymmetric distribution of mixed content via a network.

At step 202 of the method 200, a plurality of different content is received for distribution to a plurality of M different service group sizing splitters. In one exemplary embodiment the plurality of different content includes optical content configured for distribution via a passive optical network (PON). In alternative implementations, the content may be electrical signaling for distribution via coaxial cabling. In still other networks, the content may be received in a hybrid domain at input (e.g., and later converted to either electrical or optical domains). In other networks, the plurality of different service groups may be heterogeneous mixture of coaxial and fiber optic subscribers.

In one embodiment, the plurality of different content includes user content. Common examples of optical content include without limitation: 1 Gbps EPON, 10 Gbps EPON, RFoG, 1 Gbps Ethernet, and/or 10 Gbps Ethernet signals. More generally, the user content may be unicast, multicast, or broadcast. In some embodiments, the user content may be time division multiplexed, frequency division multiplexed, wave division multiplexed, or some combination thereof. User content may include data content, audio content, video content, gaming data, captioning data, metadata, etc. Certain types of user content may have certain restriction with regard to network delivery (e.g., delivery at a minimum rate, delivery at a specified time, etc.)

Various business models may apportion various amounts of bandwidth or network resources to certain types of network uses over others. For example, some customers may require dedicated and/or secure network connectivity via e.g., a coarse wave division multiplexing (CWDM) connection. Other customers may purchase various levels of quality of service (QoS), etc. In some embodiments of the present disclosure, user content may be queued for delivery and/or user content may be throttled up or down in accordance with network operational status.

In one embodiment, the plurality of different content includes network management content. In one exemplary implementation, network management content may include control information, broadcast information, device discovery signaling, user status (e.g., adding new users, deleting users etc.), use metrics, etc. Still other types of content may include test content for verifying link quality and/or diagnosing problematic connectivity. One such example is Optical Time Domain Reflectometry (OTDR), which determines the presence of a cable break and/or cable failure based on a reflection of a transmitted signal.

In one embodiment, the plurality of different content is received from one or more active components. As used herein, the term "active component" refers to any content source whether directly involved in the generation of content (e.g., video on demand (VOD), broadcast programming, etc.), or as a gateway for content (e.g., via the Internet). In other embodiments, one or more of the plurality of content may be received from another user or other logical entity of the network.

In one embodiment, each one of the plurality of M different service group sizing splitters are coupled to each one of the plurality of different content. In other embodiments, each one of the plurality of M different service group sizing splitters are coupled to a corresponding subset of the plurality of different content. In some embodiments, the coupling may be dynamically changed. In some cases, the dynamic coupling may be based on current network requirements, customer requirements, and/or current usage. For example, during some time periods, active components which provide Internet access may be preferred over broadcast television active components, and vice versa. In other embodiments, the coupling may be static, or semi-static (can be changed e.g., manually, via firmware update, etc.). For example, active component technologies or services may inherently limit service group size (e.g., dedicated CWDM); other active component technologies may be resource constrained (e.g., rolling deployments of new services, etc.)

At step 204 of the method 200, the plurality of different subscribers are divided into service groups of N different subscribers. In some embodiments, the splitting ratio is a fixed quantity. In some embodiments, the splitting ratio is a power of two. In still some variations, the splits symmetrically divide power among the taps. For example, in the exemplary embodiment, each outside plant (OSP) branch is configured to split according to a 1:32 ratio. Those of ordinary skill in the related arts, given the contents of the present disclosure, will readily appreciate that asymmetric and/or non-power of two based splitting OSPs may be used with equal success.

In one embodiment, the service groups are a fixed function of an outside plant (OSP). As previously noted, the OSP includes the physical plant of the fiber optic network and generally includes a trunk fiber(s), drop fiber(s), optical splitter(s) and similar components, and the supporting infrastructure such as conduit(s), pole(s), cabinet(s), etc. Accordingly, the OSP may have fixed characteristics that are determined a priori, or otherwise known. Common examples of such known characteristics include total throughput, total latency, path loss, customer installation sites, etc. In some cases, the OSP is planned ahead of time based on various multiple system operator (MSO) considerations. In other cases, the OSP may have been inherited from previous operators or installations (such as by acquisition, or re-use).

In one embodiment, the plurality of different subscribers include residential and commercial installations. In some embodiments, a service group is a homogenous grouping of residential or commercial installations. In some such variants, a commercial or residential installation may constitute a single dedicated service group. Such singular service groups may additionally be augmented with specialized, unique, and/or proprietary technologies (e.g., specialized encryption systems, etc.) In other embodiments, a service group is a heterogeneous grouping of residential and commercial installations.

While the present disclosure is primarily described with respect to static OSP configurations, it is readily appreciated by those of ordinary skill in the related arts, that the various principles described herein may be substituted with equal success within dynamic OSP configurations. For example, where the OSP may dynamically add, alter, or remove fiber optic cabling (via e.g., mechanical switches configured to enable or disable additional fiber optic routing, etc.), then the service groups of N different subscribers may be manipulated during operation. In other examples, the OSP may include wireless service, thereby enabling wireless subscribers to join or exit the service groups. In such implementations, dynamic control over the OSP may be controlled within software based on monitored conditions of the network, customer requirements, and/or current usage. For example, during some time periods, one service group may be enlarged to accommodate a larger number of subscribers, or shrunk to provide higher data rates, and/or greater robustness to a limited set of subscribers, etc.

At step 206 of the method 200, the outputs of the various ones of the plurality of M different service group sizing splitters are combined for distribution to the service groups of N different subscribers. In one exemplary embodiment, each service group sizing splitter feeds a number of the service groups. For example, a first service group sizing splitter feeds a first set of service groups; each of which distributes to their respective subscribers via their corresponding OSPs; a second service group sizing splitter feeds a second set of service groups (which may be different than the first). In this manner, the distribution of a particular content to subscribers is a function of the M different service group sizing splitters and the N different subscribers of each service group.

In one typical implementation, the combining is performed by connecting one or more service group sizing splitters to a PON combining multiplexer (PCM), each of which feeds to a service group. In one exemplary embodiment, the PCM merely combines the optical inputs from the different service group sizing splitters into a single output to feed its corresponding service group. Here, combining may take the form of passive combining (e.g., overlaying two or more optical signals which are orthogonally multiplexed), or active combining (e.g., unpacking each one of the optical inputs and multiplexing them together for delivery. Multiplexing may be based on time division multiplexing, frequency division multiplexing, wavelength division multiplexing, etc. In still other embodiments, multiplexing may be performed via multicast or broadcast (e.g., by multiplexing packet streams, frames, etc.)

In one embodiment, the connectivity between the service group sizing splitters and their corresponding PCMs is physically static. In one typical implementation, the service group sizing splitters and their corresponding PCMs are manually coupled via e.g., patch cables. In other embodiments, the service group splitters and their corresponding PCMs are coupled via dynamically (or semi-statically) configured connection (e.g., via an array of relays, switches, etc.). In certain variants, the physical connectivity of the service group splitters and their corresponding PCMs can by dynamically modified based on e.g., network considerations, user requests, etc.

In active combining embodiments, the combining may additionally be dynamically modulated so as to throttle up or down the various ones of the content consistent with subscriber demand. As should be readily apparent to those of ordinary skill in the related arts, each PCM may independently adjust their content provision based on their individual service group requirements, without affecting other service groups. For example, even though broadcast video may be provided to multiple PCMs, a first PCM may have a different uptake rate of the broadcast video stream than a second PCM.

In one such variant, the connectivity and/or combining is based on one or more network traffic considerations. Infrastructure configurations have maximum capacity (with regard to data throughput, bandwidth, etc.) Consequently, for network planning reasons, static connectivity and/or combining may assume peak rate performance so as to ensure consistent service to all subscribers in all conditions. In other variants, static connectivity and/or combining may balance performance and cost so as to maximize business revenues from network resources.

At step 208 of the method 200, the combined outputs are delivered via the outside plant (OSP) to the plurality of different subscribers. Various subscribers may have different requirements and or characteristics. For example, certain subscribers may be limited to certain types of content (e.g., due to legacy compatibility considerations, business considerations, customer preference considerations, etc.). In one embodiment, the plurality of different subscribers may be further equipped with a customer premises filter. In one embodiment, the customer premises filter (CPF) is configured to filter undesired wavelengths before processing the signaling of interest (e.g., to extract services for the customer). In some variants, the CPF is configured to support multiple customers; in certain implementations, the CPF may isolate a particular subscriber from the rest of its service group. In other implementations, the customer premises may additionally incorporate a firewall, router, or other similar apparatus for digitally isolating the customer premises from other digital signals that are not of interest.

In one embodiment, the plurality of different subscribers are further equipped with a high reflectance device (HRD). In one exemplary embodiment, the HRD is configured for use with network management and monitoring services such as an optical time domain reflectometer (OTDR). During normal operation, the HRD is configured to reflect a received signal back to the original source. The original source can determine, based on the reflected signal whether the intervening PON has been damaged, or otherwise compromised.

Exemplary Apparatus

Figure 3:
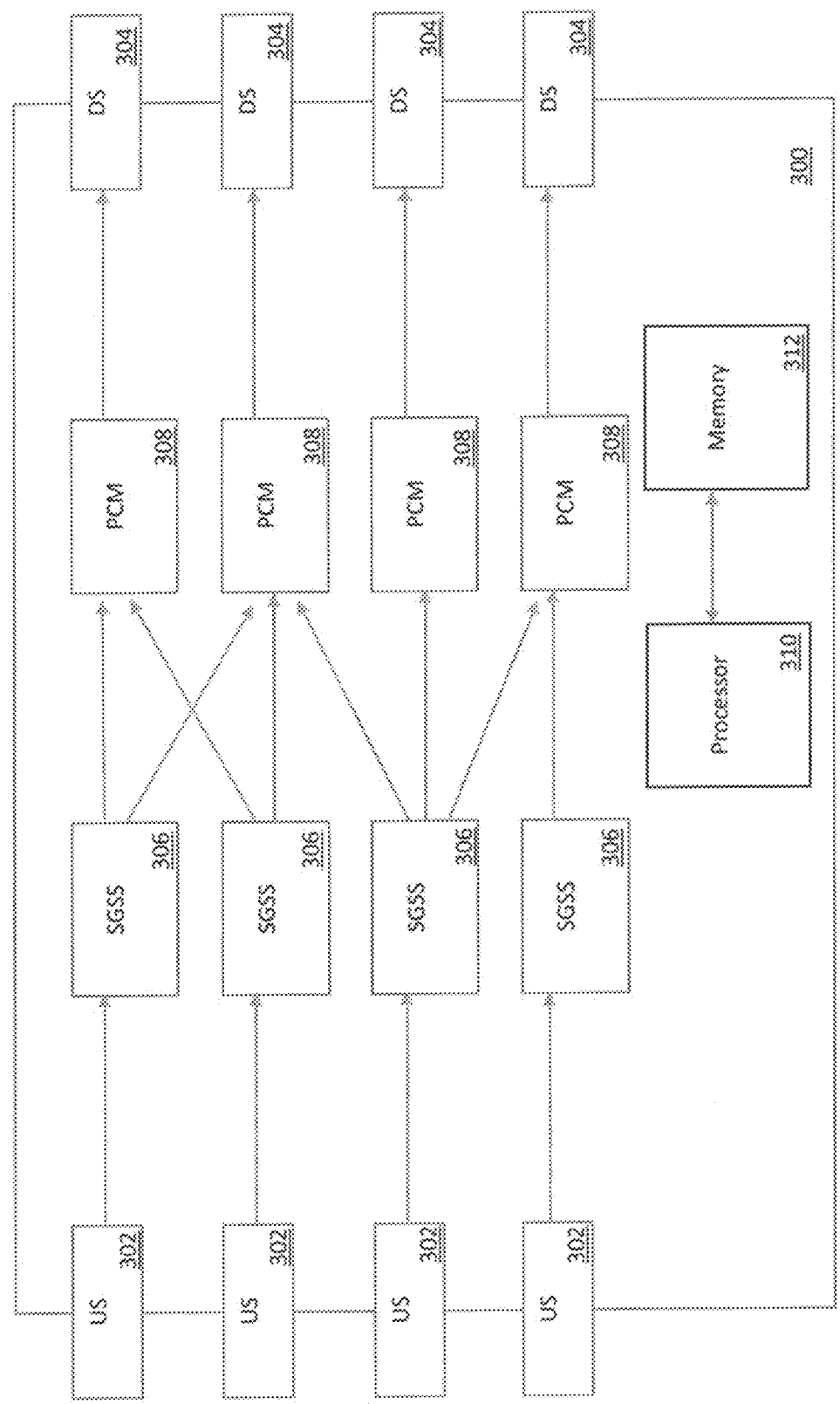
FIG. 3 is a logical block diagram of a generalized asymmetric splitting apparatus configured to asymmetrically distribute a plurality of mixed content via a network.

FIG. 3 is a logical block diagram of a generalized asymmetric splitting apparatus 300 configured to asymmetrically distribute a plurality of mixed content via a network. In the illustrated embodiment, the generalized asymmetric splitting apparatus 300 includes a plurality of upstream ports 302, a plurality of downstream ports 304, an array of service group sizing splitters 306, and an array of combining multiplexers 308. Those of ordinary skill in the related arts will readily appreciate that other constituent components may be present within the generalized asymmetric splitting apparatus 300, the foregoing being purely illustrative. In one such variant, the generalized asymmetric splitting apparatus 300 further comprises a processor 310 and a non-transitory computer readable medium 312 comprising instructions that are configured to be executed by the processor 310.

As shown the upstream ports 302 and downstream ports 304 are each configured to couple to optical fiber. Each upstream port 302 is configured to receive a content stream from an upstream device (such as an active component). In one exemplary embodiment, each downstream port 304 is configured to directly connect to a passive optical network (PON). In one exemplary deployment, the generalized asymmetric splitting apparatus 300 is deployed in a field-hardened and powered enclosure at a headend location, such as in or near a cable-modem termination system (CMTS). As will be described in greater detail hereinafter, one tangible benefit of such deployments is that the physical configuration and maintenance of the generalized asymmetric splitting apparatus 300 can be performed at a central location, without adversely affecting the diversity of different services provided to subscribers at edges of the network.

Referring back to FIG. 3, in one exemplary embodiment, the serving group sizing splitter 306 is configured to split a received optical content stream into one or more output streams. In one exemplary embodiment, the splitting is a passive power splitter having a fixed splitting ratio. In some embodiments, the splitting ratio is a power of two. In still some variations, the splits symmetrically divide power among the taps. For example, a 1:2 splitting ratio would divide the input power in half. Those of ordinary skill in the related arts, given the contents of the present disclosure, will readily appreciate that active splitting (i.e., where the signal is replicated actively reproduced as multiple copies), asymmetric, and/or non-power of two based splitting may be used with equal success.

The combining multiplexers 308 are configured to receive an optical input signal and passively combine the optical power over a number of output taps. In one variant, the resulting output is a proportionately summed signal from the input optical signaling. Alternative variants may unevenly allocate power statically or dynamically so as to e.g., support asymmetric networks (e.g., where one tap must traverse a longer distance than the others, etc.), improve performance of a particular link, etc. Those of ordinary skill in the related arts will readily appreciate that active variants may additionally provide signal conditioning and/or increase signal power.

While the foregoing discussion is primarily described with respect to a static or fixed configuration, it is readily acknowledged that various aspects of the present disclosure may be further improved by incorporating dynamic management capabilities. To these ends, certain embodiments of the present disclosure may additionally incorporate one or more processors 310 and non-transitory computer readable media 312. In such variants, the non-transitory computer readable media 312 may include one or more instructions which when executed by the processors is configured to cause the processor to perform a variety of functions including without limitation: configuration/connectivity of the service group sizing splitting and PON combining multiplexor based on input received from a network operator, monitored network performance, traffic control, and/or identification of network issues.

For example, in some embodiments the processor may be configured to cause the generalized asymmetric splitting apparatus 300 to add/remove/or swap connectivity of the uplink Additionally, in some variants, the processor may be configured to cause the generalized asymmetric splitting apparatus 300 to increase/decrease or amplify/attenuate optical uplink and/or downlink signals corresponding to any ones of the plurality of content. Those of ordinary skill in the related arts, given the contents of the present disclosure, will recognize that the intensity (power) of the optical uplink signal received from the communication resource degrades as a function of the relative distance between the communication resource and the splitting ratio. For example, an ONU which is farther from the active splitter/combiner apparatus will experience larger attenuations in optical intensity than a closer ONU. By accentuating, or diminishing the received inputs from each of the communication resources, the generalized asymmetric splitting apparatus 300 can change the "apparent" distance between the upstream device and the communication resource. As those of ordinary skill in the related arts will readily appreciate, significant amplification of the intensity of a received upstream optical signal can enable much greater distances than traditional PONs could support.

While amplification of the received inputs provides some benefit, there are drawbacks as well. Optical transmitters and receivers have practical power limitations, and in some cases can fail to operate (or be damaged) by excessive power. Accordingly, certain embodiments may adjust power so as to optimize operation within those constraints. For example, in one such case operation ensures that the signaling received from each of the communication resources is approximately equivalent (so as to provide e.g., uniformity of service). As a brief aside, the array of PON combiner elements 308 are configured to directly combine (sum) the received optical uplink signals. If one or more of the optical signals is of substantially higher power than the other signals, then the resulting output may be disproportionately dominated by the higher power signal. For similar reasons, the array of service group sizing splitters 306 may have power limitations and/or optical amplification limitations. Accordingly, variants of the present disclosure are configured to automatically equalize the power corresponding to each of the communication resources. Alternatively, certain embodiments may be configured to preferentially "boost" inputs from certain communication resources so as to e.g., provide more robust signaling, etc.

In some embodiments, the generalized asymmetric splitting apparatus 300 may be configured to provide diagnostic information for network troubleshooting. Generally, it is appreciated that the uplink and downlink cabling losses are roughly symmetric. Since the asymmetric splitting apparatus 300 is connected via point-to-point linkages to each of its serviced communication resources, performance degradation that is specific to a particular communication resource can be quickly identified by e.g., sniffing reflected traffic with an optical time domain reflectometer (OTDR) and corresponding high reflectance device (HRD) at a customer premises, etc. The ability to quickly pinpoint link issues enables network service technicians to efficiently resolve potential connectivity issues (e.g., problems with cabling etc.)

In some embodiments, generalized asymmetric splitting apparatus 300 may be further configured to correct link issues. For example, in one such variant, the generalized asymmetric splitting apparatus 300 recognizes an issue with one or multiple of the downstream PONs (based on e.g., a transmission of an erroneous or interfering modulated content, other undesirable optical signal behaviors, etc.) Responsively, generalized asymmetric splitting apparatus 300 is configured to disable and/or modify the splitting ratios and/or connectivity such that downstream reception can continue (e.g., via a redundant path, etc.).

Still other improvements and configurations enabled by incorporating dynamic management capabilities will be made readily apparent to those of ordinary skill in the related arts, given the contents of the present disclosure.

Exemplary Operation

Figure 4:
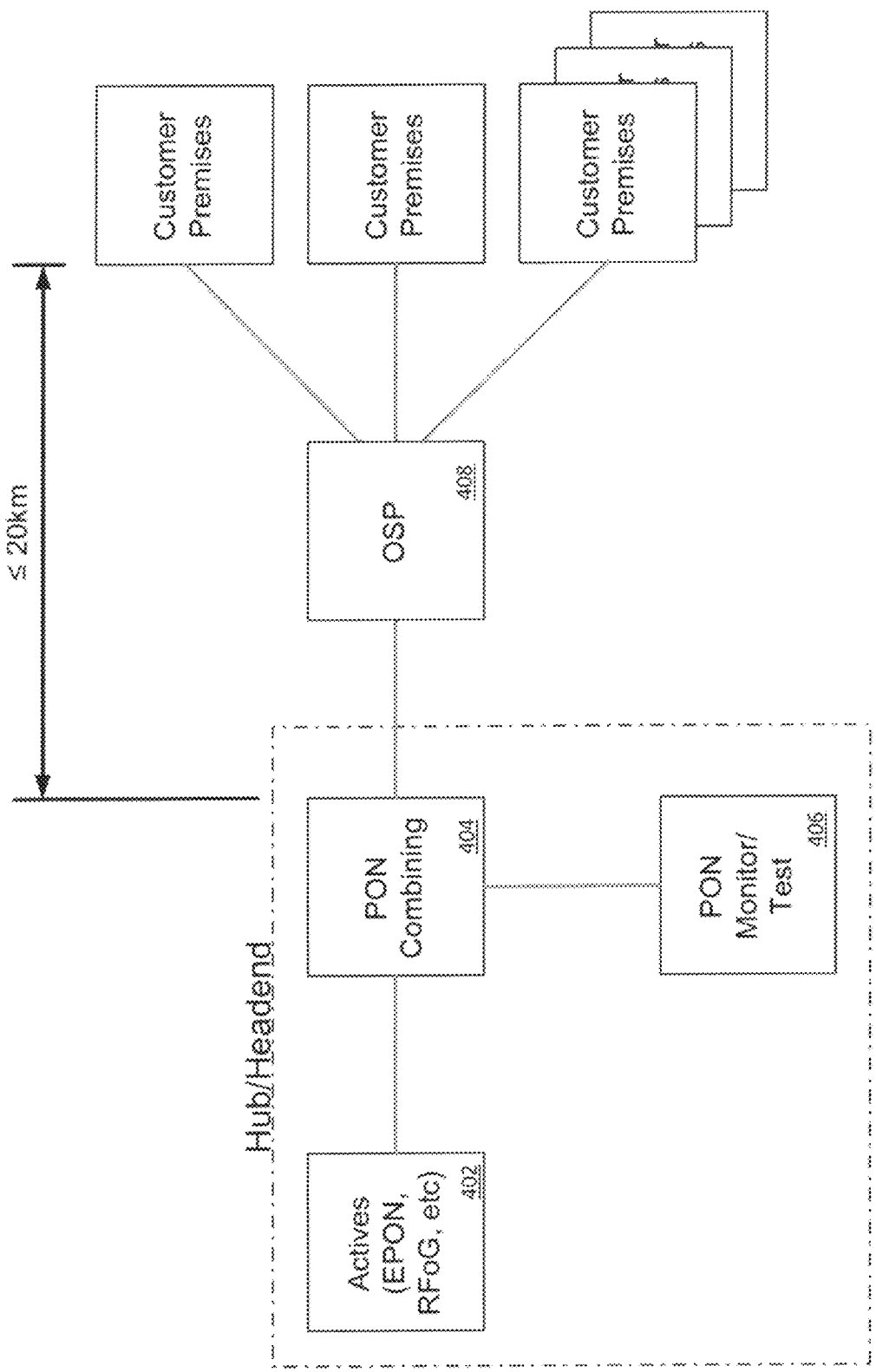
FIG. 4 is a logical block diagram representation of one exemplary optical distribution network (ODN), useful in accordance with the present disclosure.

As previously alluded to, service providers offer commercial and residential voice, video and Internet access and commercial virtual private network services, via passive optical networks (PONs). Service providers seek to maximize the utilization of the PON's capacity, where capacity of a PON is a function of the number of users serviced, the number of wavelengths on each fiber strand, and the data transmission rate. FIG. 4 is a logical block diagram representation of one exemplary optical distribution network (ODN), in accordance with the present disclosure. While the following exemplary discussion is framed within the context of a single PON that is configured to distribute optical signals for 1 Gbps EPON, 10 Gbps EPON, RFoG and one or more 1 Gbps Ethernet, 10 Gbps Ethernet signals, those of ordinary skill in the related arts will readily appreciate that the following discussions are merely illustrative of the general principles described herein. Similarly, the following discussion is based on the common off-the-shelf splitting, combining, and multiplexing components (e.g., optical splitters that support split ratios of 1:32), various other components may be readily substituted by those of ordinary skill in the related arts, given the contents of the present disclosure.

As a brief aside, the ODN is configured to carry multiple user-technologies over a single fiber from the headend to a drop segment (customer premises). Multiple signal sources coupled to the headend and their signals must be multiplexed onto a single trunk fiber for transmission to the customer premises. Before entering the customer premises the multiplexed signal must be split from the trunk fiber and transmitted on the drop segment toward the user. The split is accomplished using an optical splitter installed within the OSP. The trunk fiber is terminated at the optical splitter and each of the drop fiber segments is connected to one of the splitter output ports. Since there are multiple wavelengths and multiple users on the optical path, the individual users should be isolated from one another to enhance security and prevent interference from corrupting the optical signals. Isolation in the optical domain is accomplished by filtering the unnecessary wavelengths such that only the required wavelength(s) are able to traverse the drop segment.

As shown in FIG. 4, the optical distribution network (ODN) can be logically represented by discrete logical entities and their corresponding functions. Specifically, these include: active components 402, PON combining components 404, PON monitoring/testing components 406, the outside plant (OSP) 408, and the customer premises 410.

Active components 402 are coupled to and/or reside within the headend; each active component 402 manages and/or provides a corresponding user-technology that is transported on the ODN. In the illustrated embodiment, the active components 402 include one or more of: 1 Gbps EPON optical line terminal (OLTs), 10 Gbps EPON OLTs, RFoG transmitters and receivers, and CWDM and DWDM transceivers (e.g., attached to an Ethernet switch or router).

The PON combining block 404 is the optical aggregation (i.e., combining) point for the downstream optical signals that are transmitted by the active components 402. The PON combining block 404 also de-aggregates (i.e., splits) the upstream signals and routes the upstream signals to their appropriate active component 402. The PON combining block also sets the service group size (each serving group is composed of a number of customers) for each user-technology.

The PON monitor/test block 406 may include any of a number of components that could be used to monitor or test the network. Common examples of monitor/test components include, without limitation: optical power meters, optical spectrum analyzers, Ethernet test sets and EPON test sets. While the present disclosure treats the PON monitor/test block 406 as an entity that is distinct from other active components 402, it is readily appreciated by those of ordinary skill in the related arts that some implementations may logically incorporate monitor/test functions within the active components 402.

As previously noted, the outside plant 408 (OSP) encompasses the physical plant of the fiber optic network and generally includes a trunk fiber(s), drop fiber(s), optical splitter(s) and similar components, and the supporting infrastructure such as conduit(s), pole(s), cabinet(s), etc. The customer premises is the physical or geographic location at which the customer wishes to receive service; generally the customer premises include without limitation: optical network units (ONUs), gateways, firewalls, consumer premises equipment (CPE), etc.

Service Group Splitting

As previously alluded to, the PON combining block 404 is configured to flexibly adjust service group sizing and distribution for each user-technology independently from the other user-technologies. As used herein, the term "PON service group" refers to the stations which are commonly connected to the OSP. For example, in one exemplary embodiment, the PON service group sizes are directly related to the optical split ratios used in the ODN; thus, if the OSP employs a 1:32 split ratio, then the PON service group size is 32.

Each user-technology that is connected to the PON (e.g., services provided via the active components 402) has a corresponding service group size. As used herein, the term "active component's service group" refers to the consumer premises equipment (CPE) stations connected through the ODN to that active component 402. Like the PON service group, each active component service group has a corresponding service group size. The active component service group size will be a positive-integer multiple of the PON service group size.

Figure 5A:
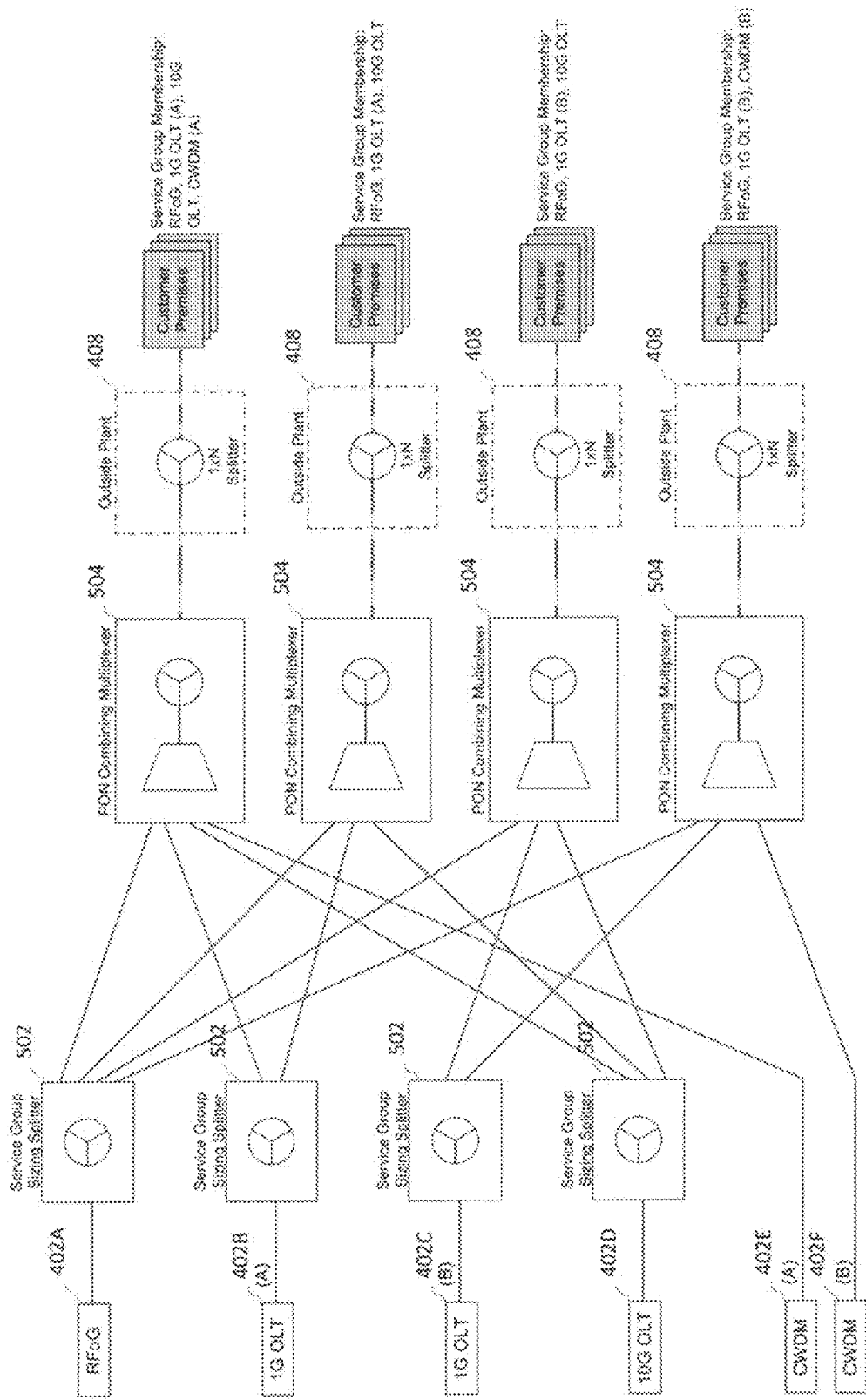
FIG. 5A is a logical block diagram representation of one exemplary passive optical network (PON) combining block, useful in accordance with the present disclosure.

Referring now to FIG. 5A, one exemplary PON combining block 404 is illustrated. As shown, the active component service group size can be increased in multiples of the PON service group by introducing a service group optical splitter 502 between the active components 402 and an array of PON combining multiplexers (PCM) 504. Since each active component 402 has an individual splitter, the service group size for each active component 402 is independent of the other active components 402. As should be made readily apparent by FIG. 5A, the active component service group is M×N customers, where M is the number of splits at the service group optical splitter 502, and N is the number of splits at the OSP. In one exemplary embodiment, the power split ratio is symmetric (i.e., evenly split between the taps) and the spitting ratio is a power of 2 (e.g., 1:2, 1:4, 1:8, 1:16, 1:32, 1:64, etc.)

In the illustrated embodiment, the RFoG active component 402A is connected to 4 PON service groups, each of which has a 1:N splitting ratio that results in an RFoG service group of 4N; if the splitting ratio is 1:32, then the service group has a total size of 128 endpoints. Two 1 G EPONs (402B, 402C) are each connected to 2 PON service groups, thus each one services 2N subscribers. The 10 G EPN (402D) is connected to 3 PON service groups, and services 3N subscribers. Two CWDM components (402E, 402F) each are singly connected to a PON, and thus are each limited to 1 PON service group apiece.

Figure 5B:
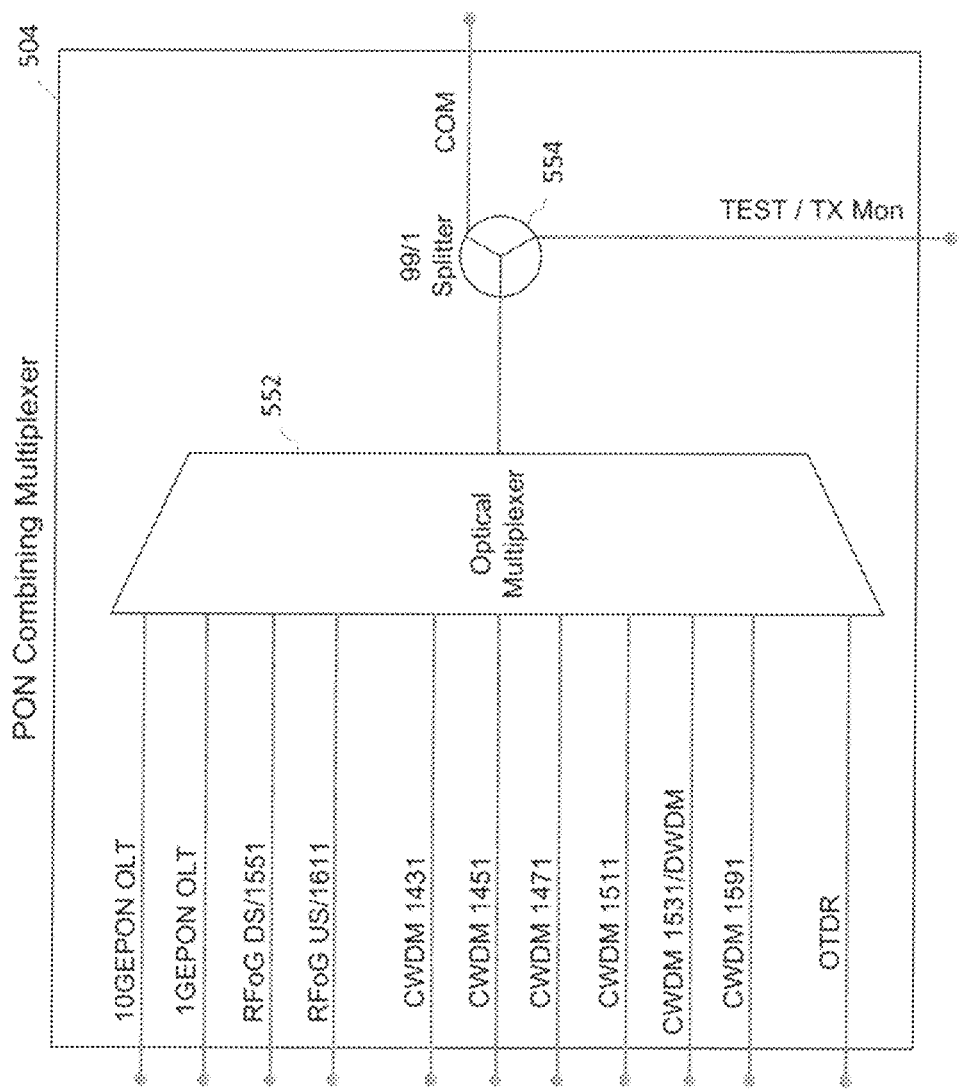
FIG. 5B is a logical block diagram representation of one exemplary PON combining multiplexer (PCM), useful in accordance with the present disclosure.

FIG. 5B is a logical block diagram representation of one exemplary PON combining multiplexer (PCM) 504. In one exemplary embodiment, the PCM 504 comprises an optical multiplexer 552 and an optical splitter 554. In one such variant, the optical multiplexer is configured to combine a plurality of optical signals onto a single common PON fiber (COM). As shown, the PCM may be configured to multiplex one or more of e.g., 10 G EPON, 1 G EPON, RFOG (downstream and upstream), one or more wavelengths of CWDM, and/or OTDR signaling.

In one implementation, the optical multiplexer 552 is configured to passively combine optical signals; in other embodiments the optical multiplexer 554 is configured to actively combine optical signals which modifies one or more characteristics of the optical signals (e.g., so as to amplify, attenuate, etc.) In some variants, the optical multiplexer 552 must be manually coupled to the appropriate optical signal source (e.g., by physically connecting the optical signals to the corresponding input terminals); in other variants, the optical multiplexer 552 is configured to dynamically enable or disable various ones of the plurality of optical signals (e.g., based on network configuration, etc.)

In one implementation, the optical splitter 554 is configured to divide an optical signal into two or more outputs. Optical splitting is typically performed passively; the optical signal is evenly split into two or more duplicate optical signals into a number of taps (generally, a power of two, e.g., 1:2, 1:4, 1:8, etc.) However, those of ordinary skill in the related arts will readily appreciate that other implementations may incorporate uneven splitting, and/or non-binary splitting (e.g., 1:3, 1:5, etc.) In the illustrated embodiment, the optical splitter 554 is configured to generate two copies of the optical signal output of the optical multiplexer 552. The first copy of the optical signal output is transmitted or otherwise propagated to the customer premises via the OSP (see FIG. 5A, supra). The second copy may be examined via monitoring apparatus to ensure proper operation. In some cases, monitoring may be unnecessary, and the output of the optical multiplexer 552 may be directly routed to the OSP. In other variants, optical splitter 554 may generate multiple copies for a variety of purposes (so as to e.g., provide failover service for another PCM, service multiple service groups, etc.)

While the illustrated embodiment of FIG. 5B is coupled to all possible technologies (e.g., 1 Gbps EPON, 10 Gbps EPON, RFoG and a limited set of CWDM or DWDM channels), it is appreciated by those of ordinary skill in the related arts that other configurations may be economically feasible in other cost sensitive deployments. For example, in one such variant, the PCM does not include the 1 Gbps EPON port under the assumption that 10 Gbps EPON is the preferred PON technology and RFoG is required for video delivery. A lower cost option may support both 10 Gbps EPON and RFoG, but not CWDM and 1 Gbps EPON. Such variants might be useful in geographic areas with no or a very small commercial population. Still another variant may support 1 Gbps EPON, 10 Gbps EPON, and RFoG, so as to accommodate migration and coexistence when needed (without CWDM).

Customer Premises Filter

Those of ordinary skill in the related arts will readily appreciate that the ODN carries multiple wavelengths from the headend to the customer premises, only a portion of which are for the customer. Accordingly, in one aspect of the present disclosure, the customer premises equipment (CPE) is configured to filter undesired wavelengths before processing the signaling of interest (e.g., to extract services for the customer). In one exemplary embodiment, the CPE includes an optical multiplexer/filter, referred to as the customer premises filter (CPF).

Figure 6B:
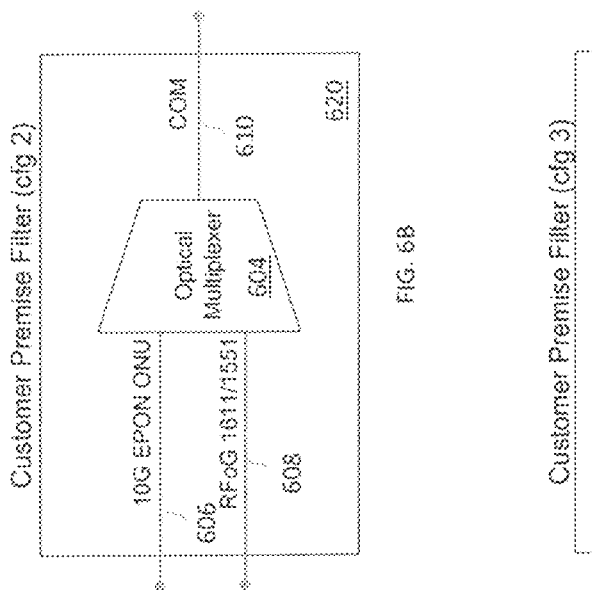
FIG. 6A-6C are logical block diagram representations of three (3) distinct implementations of an exemplary customer premises filter (CPF), useful in accordance with the present disclosure.
Figure 6C:
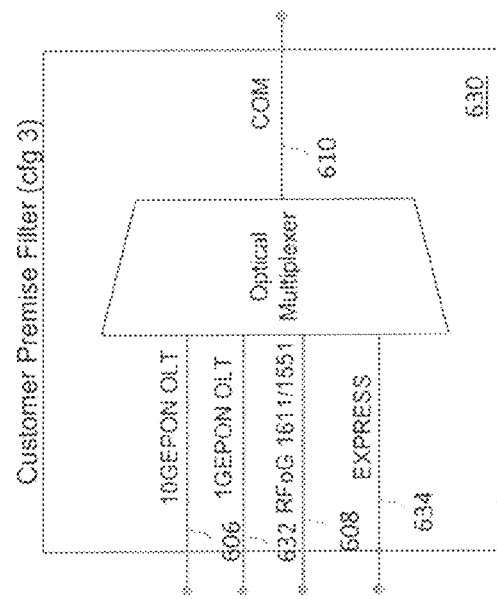
Figure 6A:
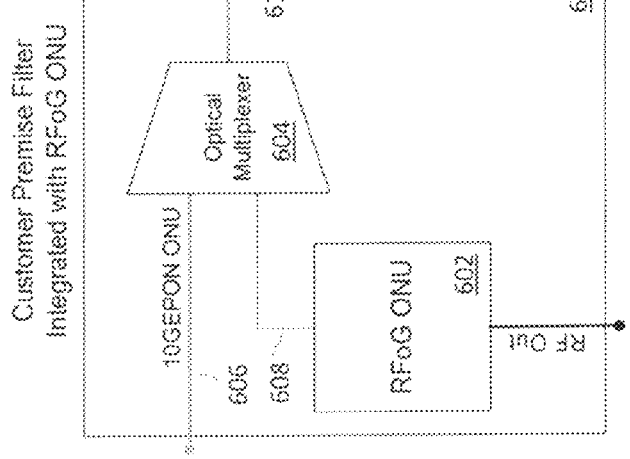

FIG. 6A-6C illustrate three (3) distinct implementations of the exemplary CPF. Unlike a PON combining multiplexers (PCM), the exemplary CPF combines the RFoG upstream and downstream signals on the same output port.

As shown in FIG. 6A, in the first variant, the CPF 600 may be integrated with the RFoG ONU 602 at a customer premises location. In one such variant, an integrated 10 G EPON filter/MUX 604 is configured to filter out all wavelengths other than those used for 10 G EPON 606 and RFOG 608. The resulting optical signaling is combined and output via the common output 610.

FIG. 6B illustrates a second variant characterized by a standalone CPF 620 which does not include an RFoG ONU. The standalone CPF 620 includes an RFoG port 608 and a 10 G EPON port 606. By decoupling the RFoG ONU from the standalone CPF 620, the standalone CPF 620 can be a useful alternative for residential installations when either RFoG is not available, or for use with a third party (or other external) RFoG ONU. Such applications may arise in residential installations and some commercial installations. As with FIG. 6A, the CPF 620 combines the output via the common output 610.

FIG. 6C illustrates a third variant characterized by a standalone CPF 630, which incorporates a RFoG port 608, a 10 G EPON 606, a 1 G EPON port 632, and an Express port 634. The standalone CPF 630 is primarily for commercial installations. In some implementations, a coarse wave division multiplexing (CWDM) filter is also installed on the Express port 634 when required by the specific application.

As a brief aside, the optical fiber network can additionally incorporate testing signals within the PON combining. For example, an Optical Time Domain Reflectometer (OTDR) can be coupled to the optical fiber network as an active component for troubleshooting. Since, an OTDR characterizes the optical fiber network by detecting discontinuities in the optical fiber span based on signals that are reflected back from an endpoint, OTDR operation can be frustrated when the fiber is connected in a point to multi-point configuration (e.g., PON type configurations). More directly, a multi-point configuration may create multiple reflections of varying intensity that interfere with the OTDR operation. In one exemplary embodiment of the present disclosure, the customer premises includes a high reflectance device (HRD) to enhance the OTDR's capabilities in a PON environment.

In one such embodiment, the HRD is installed as a separate component coupled to the common output 610 of a CPF. Installing the HRD at the common output 610 of a CPF enables the installation technician to select and install the appropriate CPF separately from the HRD. This avoids the necessity of dispatching an outside plant (OSP) specialist to install or reconfigure a filter each time a customer is added to the network. In some cases, the CPF and HRD are installed at an OSP demarcation location on the customer premises. In still other embodiments, the HRD is installed in splice enclosures or pedestals.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method for asymmetric distribution of mixed content via a passive optical network, comprising:
   receiving a plurality of different content from a first set of splitters, the first set of splitters comprising a plurality of different service group sizing splitters each configured to provide at least a portion of said plurality of different content, said at least portion of said plurality of different content having been received at corresponding ones of said plurality of different service group sizing splitters from a corresponding active component outside of said passive optical network;
   dividing a plurality of different subscribers into a plurality of service groups;
   combining outputs of various ones of said plurality of different service group sizing splitters to produce combined outputs; and
   delivering said combined outputs via an outside plant (OSP) to said plurality of different subscribers, said outside plant comprising a second splitter configured to receive and deliver said combined outputs to individual ones of said plurality of different subscribers.

2. The method of claim 1, wherein said plurality of different content comprises one or more of 1 Gbps Ethernet Passive Optical Network (EPON), 10 Gbps EPON, Radio Frequency over Glass (RFoG), 1 Gbps Ethernet, and/or 10 Gbps Ethernet signals.

3. The method of claim 1, wherein said combining of said outputs of various ones of said plurality of different service group sizing splitters comprises a first combination of contents and a second combination of contents; and
   said delivering said combined outputs comprises delivering said first combination to a first service group of said plurality of service groups and delivering said second combination to a second service group of said plurality of service groups.

4. The method of claim 3, wherein said first combination comprises residential user content and the second combination comprises commercial user content.

5. The method of claim 1, wherein said combining comprises a passive combination of two or more content.

6. The method of claim 1, wherein said combining comprises an active combination of two or more content.

7. The method of claim 1, wherein said combining is based on one or more network considerations.

8. The method of claim 1, wherein said combining comprises dynamically combining said outputs of various ones of said plurality of different service group sizing splitters.

9. The method of claim 1, wherein said combining comprises combining said outputs of various ones of said plurality of different service group sizing splitters manually by a service technician.

10. The method of claim 1, wherein said dividing said plurality of different subscribers into a plurality of service groups comprises dividing said plurality of different subscribers into one or more asymmetric groups.

11. An apparatus configured to distribute mixed content asymmetrically via a network, comprising:
    a plurality of upstream interfaces configured to receive content from one or more active components;
    a plurality of downstream interfaces configured to transmit one or more combined content via an outside plant (OSP);
    a first array of optical splitters comprising an array of serving group sizing splitters configured to split said received content from one or more active components into a number of outputs; and
    an array of passive optical network combining multiplexers (PCMs), wherein each PCM is configured to combine various ones of said number of outputs from said first array of optical splitters into corresponding ones of said one or more combined content;
    wherein the OSP comprises one of a second array of optical splitters each configured to receive said corresponding ones of said one or more combined content and deliver said one or more combined content to a plurality of customer premises based on a service group membership.

12. The apparatus of claim 11, wherein at least two of said corresponding ones of said one or more combined content comprise different content.

13. The apparatus of claim 11, wherein said number of outputs corresponds to one or more service groups targeted by said received content.

14. The apparatus of claim 11, wherein said array of PCMs are configured to combine said number of outputs for distribution to said one or more service groups.

15. The apparatus of claim 11, wherein said one or more service groups targeted by said received content is determined based on one or more network considerations.

16. A non-transitory computer readable apparatus comprising one or more instructions which when executed causes a processor to:
    dynamically divide a plurality of subscribers into a plurality of service groups;
    dynamically determine one or more content targeted for at least one of said plurality of service groups;
    configure at least one service group sizing splitter to provide said one or more content to a passive optical network combining multiplexer (PCM); and wherein said PCM is configured to combine said one or more content and transmit said combined one or more content to said at least one of said plurality of service groups via a 1×N splitter disposed in a different node from said at least one service group sizing splitter.

17. The non-transitory computer readable apparatus of claim 16, wherein said dynamic division of said plurality of subscribers is based on a network consideration.

18. The non-transitory computer readable apparatus of claim 16, wherein said at least one of said plurality of service groups comprises a fixed set of subscribers.

19. The non-transitory computer readable apparatus of claim 18, wherein said fixed set of subscribers comprise residential users.

20. The non-transitory computer readable apparatus of claim 18, wherein said fixed set of subscribers is determined based on a physical structure of an outside plant (OSP).

\* \* \* \* \*